(12) United States Patent
Cornwall

(10) Patent No.: US 6,405,502 B1
(45) Date of Patent: Jun. 18, 2002

(54) FIRESTOP ASSEMBLY COMPRISING INTUMESCENT MATERIAL WITHIN A METAL EXTENSION MOUNTED ON THE INNER SURFACE OF A PLASTIC COUPLING

(76) Inventor: Kenneth R. Cornwall, 1020 Vintage Club Dr., Duluth, GA (US) 30097

( * ) Notice: Subject to any disclaimer, the term of this patent is extended or adjusted under 35 U.S.C. 154(b) by 0 days.

(21) Appl. No.: 09/573,912

(22) Filed: May 18, 2000

(51) Int. Cl.[7] .................................................. E04C 2/52
(52) U.S. Cl. ..................... 52/220.8; 52/232; 52/742.14; 52/1; 52/317; 285/42
(58) Field of Search ............................. 52/220.1, 220.8, 52/701, 742.14, 232, 1, 317; 285/189, 58, 42

(56) References Cited

U.S. PATENT DOCUMENTS

| | | | |
|---|---|---|---|
| 4,086,736 A | 5/1978 | Landrigan |
| 4,221,092 A | 9/1980 | Johnson |
| 4,272,643 A | 6/1981 | Carroll et al. |
| 4,364,210 A | 12/1982 | Fleming et al. |
| 4,573,297 A | 3/1986 | Benscoter et al. |
| 4,619,087 A | 10/1986 | Harbeke |
| 4,642,956 A | 2/1987 | Harbeke |
| 4,646,486 A | 3/1987 | Hauff |
| 4,669,759 A | 6/1987 | Harbeke |
| 4,748,787 A | 6/1988 | Harbeke |
| 4,848,043 A | 7/1989 | Harbeke |
| 4,882,886 A | 11/1989 | Harbeke |
| 4,888,925 A | 12/1989 | Harbeke |
| 4,916,800 A | 4/1990 | Harbeke |
| 4,918,761 A | 4/1990 | Harbeke |
| 4,951,442 A | 8/1990 | Harbeke, Jr. |
| 5,035,097 A | 7/1991 | Cornwall |
| 5,155,957 A | 10/1992 | Robertson et al. |
| 5,293,724 A | 3/1994 | Cornwall |
| 5,309,688 A | 5/1994 | Robertson |
| 5,347,767 A | 9/1994 | Roth |
| 5,390,465 A | 2/1995 | Rajecki |
| 5,417,019 A | 5/1995 | Marshall et al. |
| 5,452,551 A | 9/1995 | Charland et al. |
| 5,634,304 A | 6/1997 | Sakno |

Primary Examiner—Beth A. Stephan
Assistant Examiner—Naoko Slack
(74) Attorney, Agent, or Firm—Mary M. Moyne; Ian C. McLeod (57) ABSTRACT

A firestop coupling assembly for allowing the passage of utility members through a hole in a partition while preventing the transmission of fire and smoke through the hole. The coupling assembly includes a coupling and a firestop extension. The firestop extension has a housing with an inner passageway. Intumescent material is mounted in the inner passageway of the housing. The firestop extension is mounted on the coupling such that the intumescent material extends downward beyond a second end of the coupling. When the coupling assembly is exposed to heat, the intumescent material expands into the inner passageway of the housing of the firestop extension and blocks the second end of the housing of the coupling which prevents the transmission of smoke and fire through the coupling assembly.

15 Claims, 5 Drawing Sheets

FIRESTOP ASSEMBLY COMPRISING INTUMESCENT MATERIAL WITHIN A METAL EXTENSION MOUNTED ON THE INNER SURFACE OF A PLASTIC COUPLING

BACKGROUND OF THE INVENTION (1) Field of the Invention

The present invention relates to a self sealing coupling assembly which allows for the passage of utility members through partitions of a structure such as floors or walls while preventing the transmission of fire and smoke through the coupling assembly. In particular, the present invention relates to a self sealing coupling assembly which includes an extension adjacent one end having an intumescent material which expands to block the inner passageway of the extension to prevent the transmission of fire and smoke through the inner passageway of the coupling assembly.

(2) Description of the Related Art

The related art has shown various types of firestop couplings using intumescent material to close the passageway to prevent the transmission of fire and smoke through the passageway. Illustrative are U.S. Pat. No. 4,272,643 to Carroll et al; U.S. Pat. No. 4,364,210 to Fleming et al; U.S. Pat. No. 4,573,297 to Benscoter et al; U.S. Pat. No. 5,155,957 to Robertson et al; U.S. Pat. No. 5,309,688 to Robertson U.S. Pat. No. 5,347,767 to Roth and U.S. Pat. No. 5,417,019 to Marshall et al.

Carroll et al shows a fire resistant fitting having plates with a disc of expandable fire resistant material spaced therebetween. The plates and disc have passageways for the conduits.

Fleming et al describes a fire barrier device having a sleeve of intumescent material affixed to the interior of a cylindrical penetration. An end cap is mounted in one end of the cylindrical penetration. The end cap functions to seal the penetration against the passage of flames, smoke and gas. The end cap can be constructed of an intumescent material or a flame proof elastomeric material. The use of an elastomeric material improves the seal around the conduit or other member passing through the end cap. The cap has a plurality of radial cuts such that the cap is divided into a plurality of segments. The segments are easily displaced to permit the passage of a conduit past the segments wherein the segments can be manipulated into conformance about the cable. Alternatively, the end cap can be custom fitted with a specific diameter aperture or apertures.

Benscoter et al describes a poke-through floor fitting having a firestop means for sealing the fitting against the passage of fire and smoke through the fitting. The fitting has openings for power conductors and communication conductors.

Robertson et al describes a fire safety device for closing through-holes in floors and walls. The device includes a conduit which is surrounded by a cup-shaped retainer. The conduit may be formed of any suitable material. The retainer is preferably constructed of sheet metal. The retainer is spaced a uniform distance from the outer surface of the conduit to provide a confined space for the intumescent material. The retainer is spaced away from the outside wall of the conduit except at its bottom edge where the retainer conforms to the outside wall of the conduit to prevent leakage of molten intumescent material therebetween. The upper end of the retainer has a plurality of outwardly extending flanges for attaching the retainer to a floor or wall surface. An annular cover disk is attached to the upper end of the retainer to cover the top of the confined space having the intumescent material. The bottom end of the retainer is provided with floating tabs which extend the floor of the retainer inwardly upon destruction of the conduit to prevent the molten intumescent material from falling through the bottom of the retainer cup.

Robertson describes a penetration unit for use in a concrete slab for receiving a service line or pipe. An intumescent material may be provided in the unit to crush the service line or pipe so that heat, smoke, fumes and fire will not pass up through the pipe to the next floor of the building.

Roth describes a fire retardant sleeve assembly having a tubular housing with a collar having intumescent material which is securely held in place by the housing. The housing also acts as a heat conductive shield. The assembly allows a user to slide a raceway into and through a ceiling or floor.

Marshall et al describes a coupling device to provide a pass through opening for pipes in the wall of a structure. The coupling device includes an outer housing having an open lower end and a closed upper end with coupling elements extending therebetween. An intumescent material surrounds the coupling elements and fills the space between the coupling elements and the outer housing. The intumescent material locates and positions the coupling elements within the outer housing. The intumescent material is positioned such that the material expands to close off the pass through opening and prevent smoke or fire from traveling through the wall of the structure.

Also of interest are U.S. Pat. No. 4,221,092 to Johnson; 4,848,043 to Harbeke; U.S. Pat. No. 4,882,886 to Harbeke; U.S. Pat. No. 4,888,925 to Harbeke; U.S. Pat. No. 4,916,800 to Harbeke; U.S. Pat. No. 4,951,442 to Harbeke, Jr.; U.S. Pat. No. 5,390,465 to Rajecki and U.S. Pat. No. 5,452,551 to Charland et al.

Johnson describes a sleeve which limits the spread of fire through the floors and walls. The sleeve is constructed of an intumescent material having embedded metallic heat conductors to increase heat conductivity through the intumescent material.

Harbeke ('043) describes an under the floor firestop coupling assembly. The coupling assembly includes a tubular-shaped main body with a main body flange to which a firestop collar including a metallic band and intumescent material is mounted. The metallic band is wrapped into a tubular shape with the ends of the metallic band being attached together by rivets or screws. The lower end of the metallic band includes inwardly directed tabs to support the intumescent material and to receive and conduct heat throughout the metallic band. The coupling is mounted into a hole in the floor such that the main body flange contacts a bottom surface of the floor and the firestop metallic band extends below the floor. A lower main body portion extending below the main body flange is sufficiently long such that the firestop collar can be mounted thereon and the lower end of the firestop collar is approximately located at a lower end of the lower main body portion but not much longer. The firestop collar is rigidly mounted on the pipe coupling both by friction caused by internal pressure of the metallic band pressing radially inwardly and by an adhesive placed between the intumescent material and the outer surface of the lower main body portion. In addition, once the main body flange is against the floor, fasteners are driven through the outwardly directed tabs of the metallic band and the main body flange into the bottom of the floor.

Harbeke ('886) describes a pipe attachment device having an intumescent material cuff. The intumescent material cuff is not enclosed in a housing.

Harbeke ('800 and '925) describe pipe coupling assemblies having an intumescent collar mounted around a first end of the pipe coupling with a metallic band wrapped around the intumescent collar. The metallic band serves to protect and hold the intumescent collar together and provides a heat conductor at the circumferential surface of the intumescent collar.

Harbeke, Jr. ('442) describes a, firestop collar for mounting around pipes. The collar has an intumescent material surrounded by a metallic band.

Ralecki describes a device for installation in a building wall or floor to provide a pass through opening. The device has an open first end and a second end closed by a wall. A ring of intumescent material fills the open first end. The intumescent ring can be provided with a central opening sized to engage with an interference fit, a pipe passing through the device. Alternatively, the ring can support a tube coupling for providing a tubular connection within the device to receive and couple pipes on opposite sides of the wall or floor.

Charland et al describes a firestop assembly having at least two (2) intumescent firestop rings and a restraining collar for use with plastic pipes. The rings are provided in a tiered effect to provide better heat transfer. By providing tiered rings, the rings expand rapidly to close the area between the collapsing pipe and the rings.

Only of minimal interest are U.S. Pat. No. 4,086,736 to Landrigan; U.S. Pat. No. 4,619,087 to Harbeke; U.S Pat. No. 4,642,956 to Harbeke; U.S Pat. No. 4,646,486 to Hauff; U.S Pat. No. 4,669,759 to Harbeke; U.S Pat. No. 4,748,787 to Harbeke; U.S Pat. No. 4,918,761 to Harbeke; U.S Pat. No. 5,035,097 to Cornwall and U.S Pat. No. 5,634,304 to Sakno.

Landrigan describes a fire and/or liquid seal in a structural wall having a tube-like support extending through the wall with conduits positioned in the support and surrounded by insulation material in the form of silicone foam or packed ceramic fibers.

Harbeke ('087) describes a support apparatus and method for attaching fluid-conveying pipe couplings of various lengths to a metal concrete form which is to be embedded in concrete barriers of various thicknesses.

Harbeke ('956) describes a fire-retardant fluid-coupling for mounting in a concrete floor. The coupling has an intumescent material wrapped about one end with the intumescent material exposed at the bottom side of the concrete floor.

Hauff describes a feedthrough assembly having a passageway for receiving conduits. A lining member in the passageway has at least one elastomeric adaptor which engages the wall surface of the passageway and the outer surface of the conduit. The lining member is formed with a hollow chamber which is filled with a material which reacts endogenetically and emits a fire-inhibiting gas when heated.

Harbeke ('759) describes a fire stack fitting for receiving pipes to be coupled from first and second ends. The fitting has a cavity at one end for holding the intumescent material. The cavity is open to the first side of the wall.

Harbeke ('787) describes a cast-in firestop coupling having an intumescent collar. The intumescent collar has an outer layer of tape which forms a protective and supportive coating for the intumescent material. The intumescent collar is open at the bottom of the coupling to air.

Harbeke ('761) describes a toilet flange mount having an intumescent material collar mounted around the outer surface at the lower end. The intumescent collar includes wraps which are frictionally clamped about the outer surface by a metal strip.

Cornwall describes a coupling to be secured in a hole in a concrete floor or wall. The coupling has elastic rings which hold and locate the pipe in place in the coupling.

Sakno describes a firestop conduit element having the intumescent material contained within an external, moisture impenetrable barrier.

There remains the need for a firestop coupling assembly having a plastic sleeve and an extension where the extension extends below the sleeve and includes a metal housing with intumescent material adjacent one end of the housing. The intumescent material expands to crush the utility members or to surround the utility members so as to prevent the transmission of smoke and fire through the inner passageway of the coupling assembly.

SUMMARY OF THE INVENTION

The firestop coupling assembly of the present invention allows for the passage of utility members through a hole in a partition such as a floor, ceiling or wall of a structure while preventing the transmission of fire and smoke through the hole. The coupling assembly includes a plastic coupling and a firestop extension. The firestop extension has a metal housing within which is mounted the intumescent material. The intumescent material is mounted at one end of the housing spaced apart from the coupling. In one (1) embodiment, a conduit is mounted in the open, top end of the coupling and extends away from the firestop extension to a surface of the partition. In use, the coupling assembly is mounted in a hole in a floor, wall or ceiling of a structure. The utility members are then passed through the conduit and the coupling assembly. In one (1) embodiment, a pass through utility member is adjustable along the length of the coupling and extends completely through the coupling and the firestop extension. In one (1) embodiment, the firestop extension extends below a lower surface of the partition. In another embodiment, the entire coupling is mounted in a cored hole in the partition. When the coupling assembly is exposed to heat, the intumescent material expands into the inner passageway of the firestop extension and prevents the transmission of smoke and fire through the coupling assembly.

The substance and advantages of the present invention will become increasingly apparent by reference to the following drawings and the description.

DESCRIPTION OF THE PREFERRED EMBODIMENTS

The present invention relates to a firestop coupling assembly for use in allowing utility members to pass through a partition of a structure and to prevent transmission of fire and smoke through the partition of the structure, which comprises: a coupling constructed of plastic having an open first end and an open second end with a sidewall having an outer surface and an inner surface extending therebetween and having an inner passageway around a longitudinal axis of the assembly; and a firestop extension mounted on the sidewall of the coupling and including a housing constructed of metal having an inner passageway and an intumescent material mounted in the inner passageway adjacent one end of the housing spaced apart from the coupling wherein when the intumescent material is heated above a predetermined temperature, the intumescent material expands to fill the inner passageway of the housing.

Still further, the present invention relates to a method for allowing utility members to pass through a partition of a structure while preventing transmission of fire and smoke through the partition of the structure, which comprises the steps of: providing a coupling assembly including a coupling constructed of plastic having an open first end and an open second end with a sidewall having an outer surface and an inner surface extending therebetween around a longitudinal axis of the assembly; and a firestop extension mounted on the sidewall of the coupling and including a housing constructed of metal having an inner passageway extending therebetween and an intumescent material mounted in the inner passageway wherein when the intumescent material is heated above a predetermined temperature, the intumescent material expands to fill the inner passageway of the housing; mounting the coupling assembly in the partition of the structure which includes: (i) securing the coupling of the coupling assembly to a portion of the partition; (ii) providing a cover for the open first end of the coupling; (iii) placing the cover on the open first end of the coupling (iv) pouring concrete around the coupling assembly and allowing the concrete to harden to form the partition; and (v) removing the cover; and extending utility members through the firestop coupling assembly wherein when the intumescent material mounted in the housing of the firestop extension of the coupling assembly is heated above a preset temperature, the intumescent material expands to close the inner passageway of the housing of the firestop extension and sealingly expand around the utility members extending through the coupling assembly such that smoke and fire are unable to move past the intumescent material in the inner passageway of the housing of the firestop extension.

Further, the present invention relates to a fluid conduit system for use in a structure for carrying fluid through the structure and to prevent the transmission of fire and smoke through a partition of the structure, the system which comprises: fluid carrying conduits for carrying fluid through the structure; and at least one coupling assembly mounted in the partition of the structure wherein the coupling assembly includes: (i) a coupling constructed of plastic having an open first end and an open second end with a sidewall having an outer surface and an inner surface extending therebetween and having an inner passageway around a longitudinal axis of the assembly; and (ii)a firestop extension mounted on the sidewall of the coupling and including a housing constructed of metal having an inner passageway and an intumescent material mounted in the inner passageway adjacent one end of the housing spaced apart from the coupling wherein the fluid carrying conduits extend through the coupling assembly through the partitions and wherein when the intumescent material is heated above a predetermined temperature, the intumescent material expands to fill the inner passageway of the housing around the fluid carrying conduits and acts to seal the inner passageway of the housing and the coupling.

Figure 1:
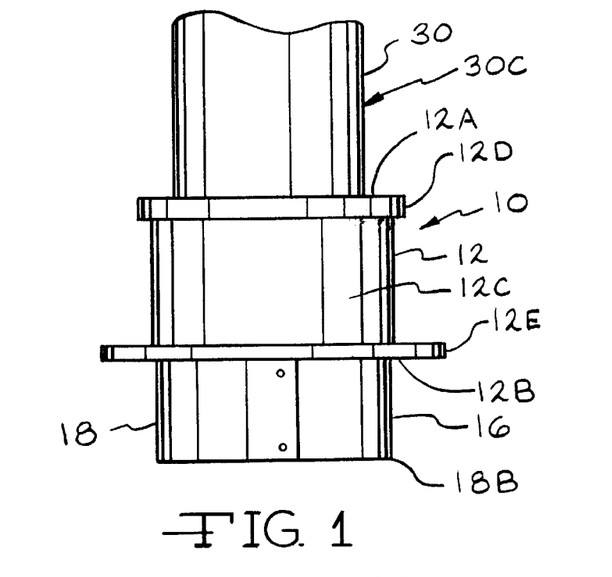
FIG. 1 is a side view of the coupling assembly 10 or 210 of the first or second embodiment.
Figure 2:
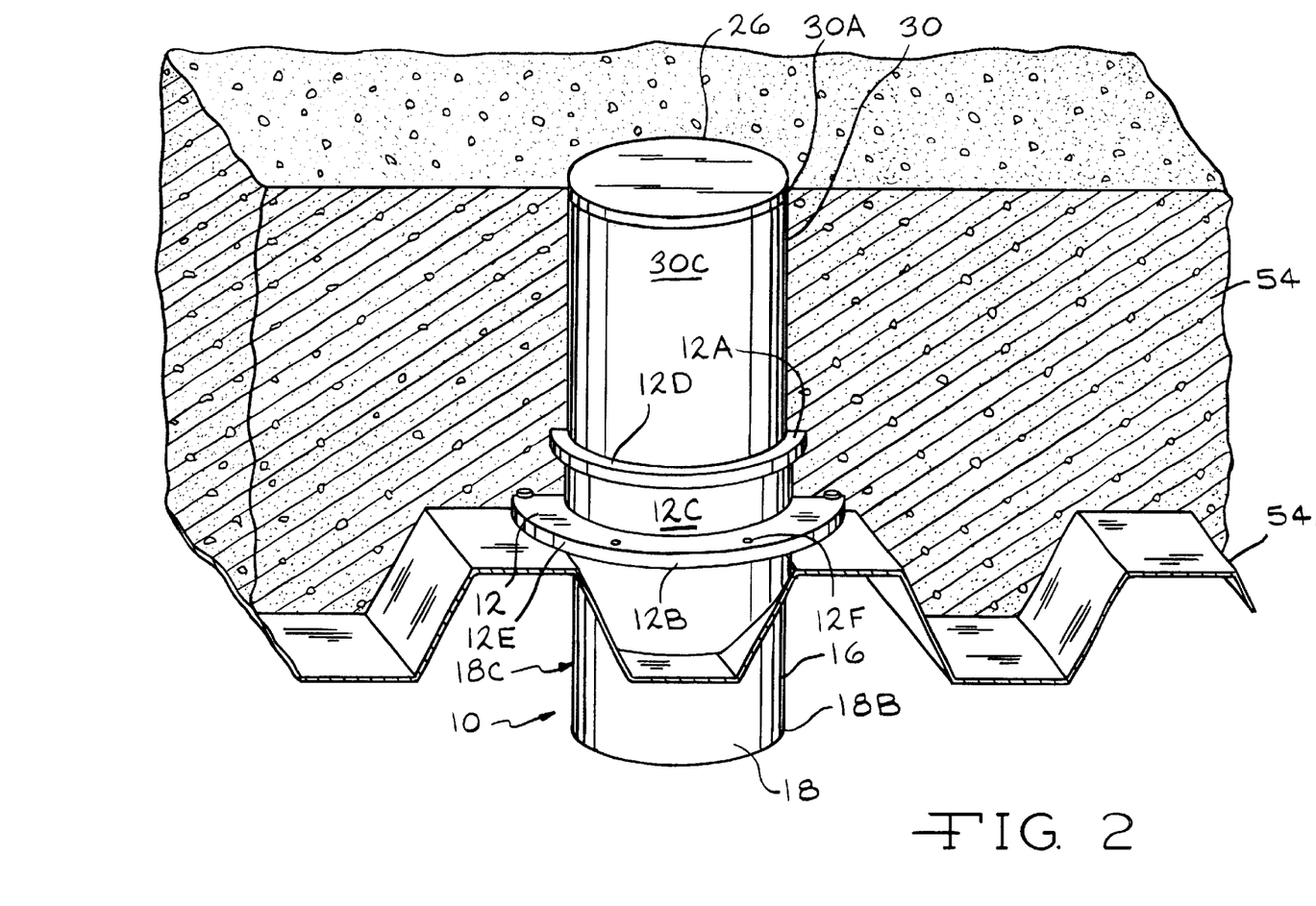
FIG. 2 is a perspective view of the coupling assembly 10 or 210 of the first or second embodiment mounted in a corrugated deck 54A of a concrete partition 54.
Figure 3:
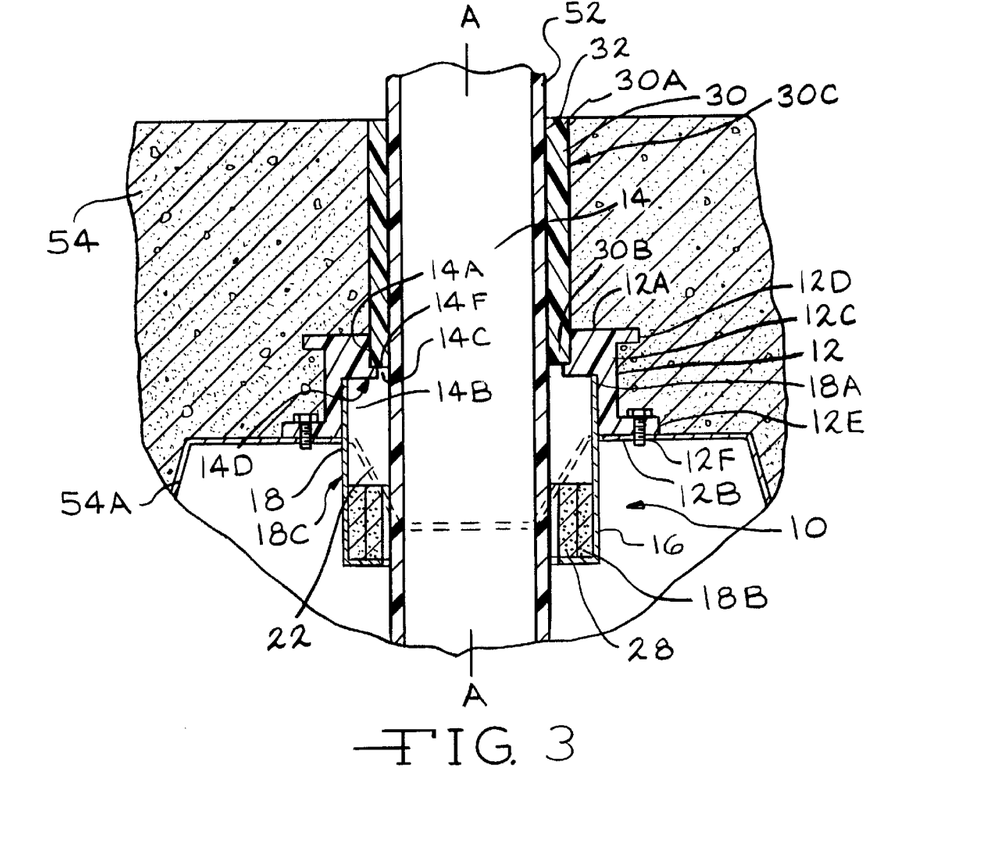
FIG. 3 is a cross-sectional view of the coupling assembly 10 of the first embodiment mounted in a corrugated deck 54A of a concrete partition 54.

FIGS. 1 to 6 show the coupling assemblies 10, 210 and 310 of the present invention. Each of the coupling assemblies 10, 210 and 310 includes a coupling 12, 212 and 312, and a firestop extension 16, 216 and 316. The coupling 12, 212 and 312 has an essentially cylindrical shape with an open first end 12A, 212A and 312A, and an open second end 12B, 212B and 312B with a sidewall 12C, 212C and 312C extending therebetween forming an inner passageway 14, 214 and 314 along the longitudinal axis A—A, B—B and C—C of the coupling assembly 10, 210 and 310. In the first and second embodiments, the outer surface of the sidewall 12C and 212C of the coupling 12 and 212 is provided with an anchor ring 12D and 212D at the first end 12A and 212A and a mounting flange 12E and 212E at the second end 12B and 212B (FIGS. 1 to 4). The mounting flange 12E and 212E is provided with holes 12F which allow for mounting the coupling assembly 10 or 210 to a concrete form (not shown) or corrugated deck 54A (FIGS. 2 and 3). In the third embodiment, the first end 312A of the coupling 312 has a top flange 312D. The inner passageway 14 of the coupling 12 of the first embodiment has a first portion 14A adjacent the first end 12A of the coupling 12 and a second portion 14B adjacent the second end 12B of the coupling 12 with a center portion 14C therebetween (FIG. 3). In the preferred embodiment of the first embodiment, the inner diameter of the center portion 14C of the inner passageway 14 is less than the diameters of the first and second portions 14A and 14B such that a shoulder 14D is formed in the second portion 14B and a ledge 14F is formed in the first portion 14A. In the second embodiment, the inner passageway 214 has a first portion 214A and a second portion 214B with the first portion 214A having an inner diameter less than the second portion 214B such that a shoulder 214D is formed at the intersection of the portions 214A and 214B. In all the embodiments, the coupling 12, 212 and 312 is preferably constructed of a high temperature, fire rated PVC resin material such that the coupling 12, 212 or 312 will not melt or collapse when heated beyond the preset temperature.

The firestop extension 16, 216 and 316 includes an outer housing or casing 18, 218 and 318 having a first end 18A, 218A and 318A and a second end 18B, 218B and 318B with a sidewall 18C, 218C and 318C extending therebetween forming an inner passageway 22, 222 and 322. In the first and second embodiments, the firestop extension 16 and 216 is mounted in the inner passageway 14 and 214 of the coupling 12 and 212 such that an outer surface of the housing 18 and 218 is adjacent and in contact with an inner surface of the coupling 12 and 212. In the first and second embodiments, the first end 18A and 218A of the housing 18 and 218 extends into the inner passageway 14 and 214 of the coupling 12 and 212 such that the first end 18A and 218A of the housing 18 and 218 abuts against the shoulder 14D and 214D formed in the inner passageway 14 and 214 of the coupling 12 and 212. Screws 24 are inserted through the coupling 12 and 212 adjacent the mounting flange 12E and 212E and extend inward toward the inner passageway 14 and 214 of the coupling 12 and 212 and the firestop extension 16 and 216. The screws 24 are preferably of such a length as to extend completely through the coupling 12 and 212 and into and through the housing 18 and 218 of the firestop extension 16 and 216 to secure the firestop extension 16 and 216 to the coupling 12 and 212. It is understood that the firestop extension 16 and 216 can be secured to the coupling 12 and 212 by any well known means. In the third embodiment, the housing 318 is mounted on the outer surface of the coupling 312 such that the coupling 312 is in the inner passageway 322 of the housing 318 with the outer surface of the sidewall 312C of the coupling 312 adjacent and in contact with the inner surface of the sidewall 318C of the housing 318. In the third embodiment, the housing 318 is mounted on the coupling 312 such that the first end 318A of the housing 318 is adjacent and abuts against the top flange 312D at the first end 312A of the coupling 312. In the third embodiment, the firestop extension 318 is secured to the coupling 312 by inserting or punching the housing 312 of the firestop extension 318 into holes 312G in the sidewall 312C of the coupling 312. However, it is understood that the firestop extension 318 can be secured to the coupling 312 by any well known means. In all the embodiments, the second end 18B, 218B and 318B of the housing 18, 218 and 318 extends beyond the second end 12B, 212B and 312B of the coupling 12, 212 and 312 away from the first end 12A, 212A and 312A of the coupling 12, 212 and 312. In all the embodiments, the intumescent material 28, 228 and 328 is preferably spaced apart from the coupling 12, 212 and 312. The intumescent material 28, 228 and 328 is preferably mounted in the inner passageway 22, 222 and 322 of the firestop extension 16, 216 and 316 adjacent the second end 18B, 218B and 318B of the housing 18, 218 and 318. The second end 18B, 218B and 318B of the housing 18, 218 and 318 preferably extends beyond the intumescent material 28, 228 and 328 and is preferably folded over and inward such as to be adjacent the bottom edge of the intumescent material 28, 228 and 328. The housing 18, 218 and 318 preferably is folded inward such as to allow for an opening to the inner passageway 22, 222 and 322 of the housing 18, 218 and 318 and coupling 12, 212 and 312 having a diameter substantially equal to the diameter of the inner passageway 22, 222 and 322 of the coupling 12, 212 and 312 at the first end 12A, 212A and 312A. The folding of the housing 18, 218 and 318 inward assists in holding the intumescent material 28, 228 and 328 in the inner passageway 22, 222 and 322 of the firestop extension 16, 216 and 316 and ensures that when the intumescent material 28, 228 and 328 is heated above the predetermined temperature, the intumescent material 28, 228 and 328 expands inward and upward into the inner passageway 22, 222 and 322 of the firestop extension 16, 216 and 316. The material used to construct the housing 18, 218 and 318 of the firestop extension 16, 216 and 316 preferably allows the transfer of heat to the intumescent material 28, 228 or 328 to be greater than if the intumescent material 28, 228 or 328 were encased only in the partition 54 or 56 which in the preferred embodiment is constructed of concrete. In the preferred embodiment, the housing 18, 218 or 318 is constructed of 26 gauge metal.

Figure 4:
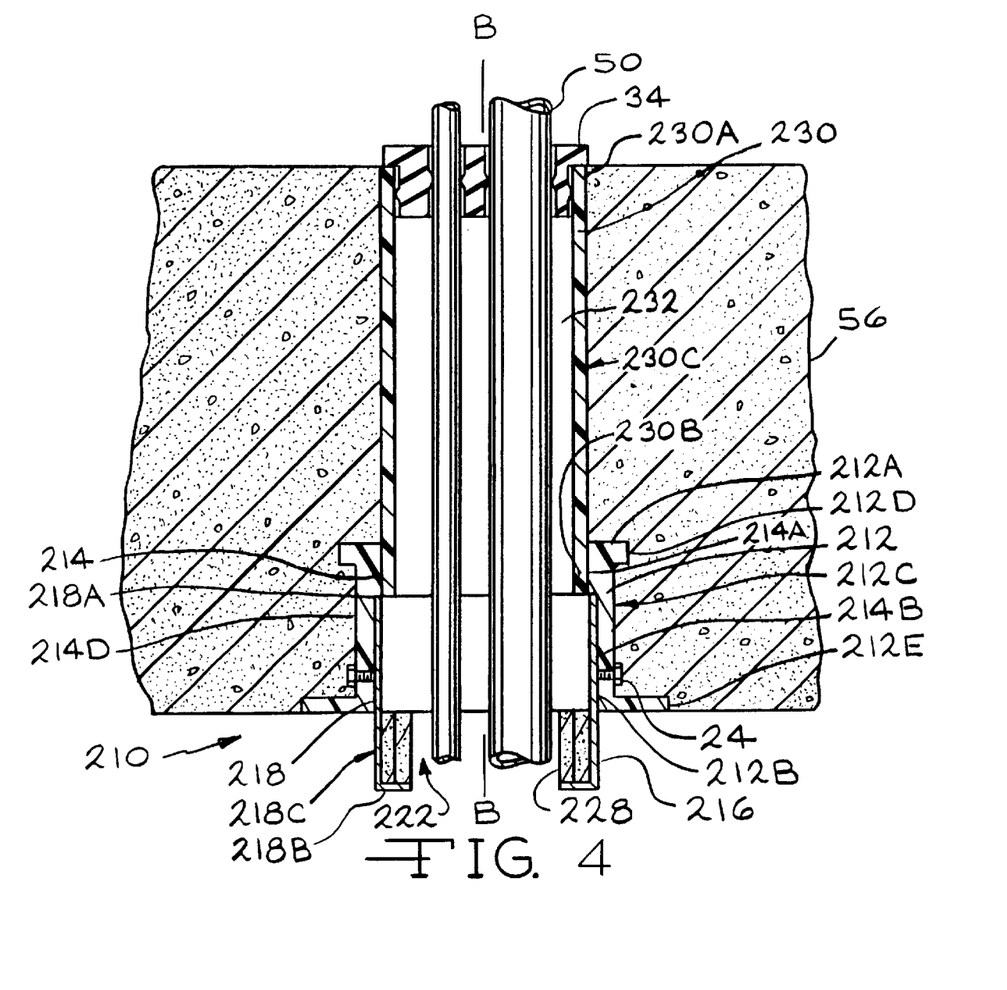
FIG. 4 is a cross-sectional view of the coupling assembly 210 of the second embodiment mounted in a concrete partition 56 having multiple utility members 50 extending through the coupling assembly 210.
Figure 5:
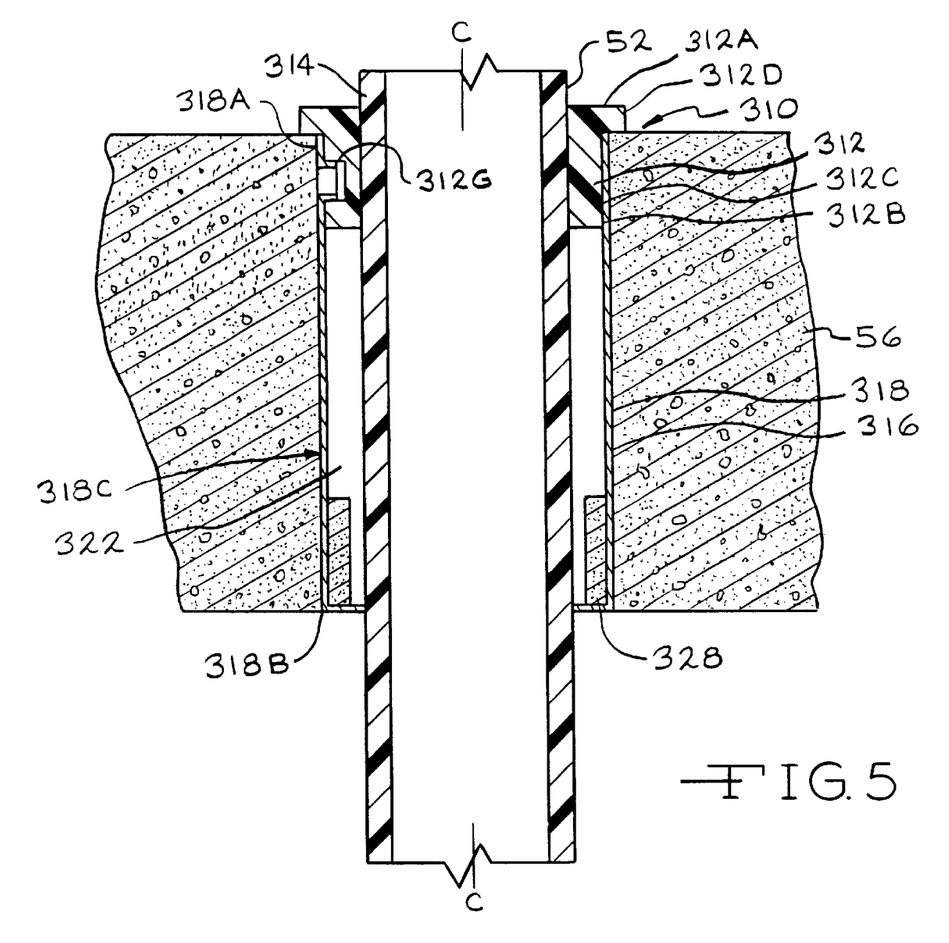
FIG. 5 is a cross-sectional view of the coupling assembly 310 of the third embodiment showing the coupling assembly 310 mounted in a cored hole in a concrete partition 56.
Figure 6:
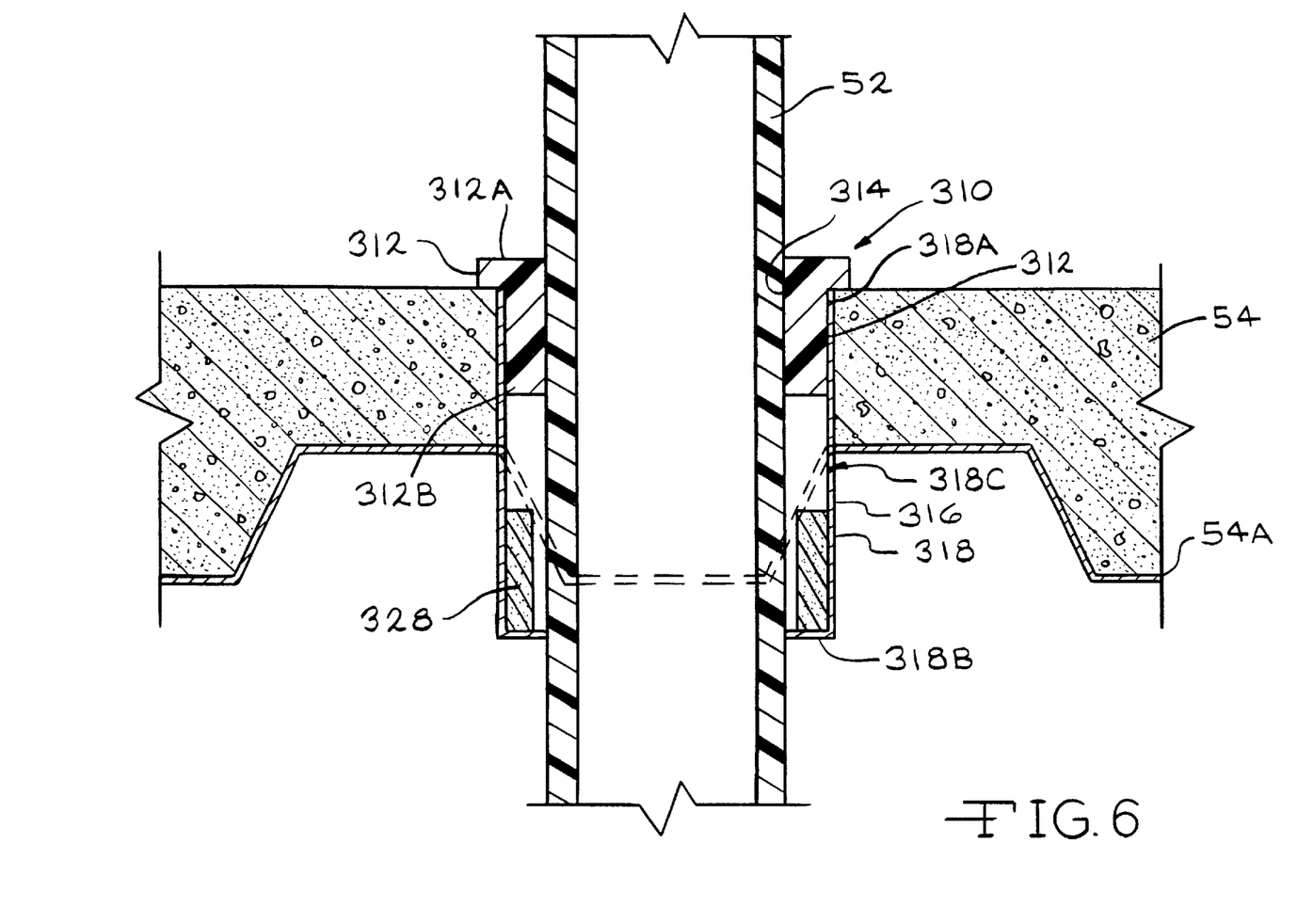
FIG. 6 is a front view of the coupling assembly 310 of the third embodiment showing the coupling assembly 310 mounted in a cored hole in a concrete partition 54 having a corrugated deck 54A.

In the first and second embodiments, a conduit 30 and 230 or upper extension is preferably mounted in the inner passageway 14 and 214 of the coupling 12 and 212 adjacent the first end 12A and 212A. The conduit 30 and 230 and coupling 12 and 212 are also known collectively as a sleeve coupling. The conduit 30 and 230 preferably has a cylindrical shape with an open first end 30A and 230A and an open second end 30B and 230B with a sidewall 30C and 230C therebetween forming the inner passageway 32 and 232 of the conduit 30 and 230. In the first embodiment, the conduit 30 is mounted in the coupling 12 such that the second end 30B of the conduit 30 extends into the first end 12A of the coupling 12 and the second end 30B of the conduit 30 is adjacent the ledge 14F formed by the center portion 14C of the inner passageway 14 (FIG. 3). In the second embodiment, the conduit 230 extends into the first portion 214A of the coupling 212 and does not extend into the second portion 214B of the inner passageway 214 of the coupling 212. In the first and second embodiments, the outer surface of the conduit 30 and 230 at the second end 30B and 230B is secured to the first portion 14A and 214A of the inner passageway 14 and 214 of the coupling 12 and 212. The third embodiment does not have a conduit or upper extension. The utility member 52 preferably extends completely through the coupling 312 and through the firestop extension 316 (FIGS. 5 and 6). The sidewall of the utility member 52 is secured to the inner surface of the sidewall 312C of the coupling 312. The utility member 52 can be secured to the coupling 312 by any well known means. In all the embodiments, the conduit 30 and 230 is preferably secured to the inner surface of the sidewall 12C and 212C of the coupling 12 and 212 by any well known means such as solvent welding. Alternatively, the conduit 30 and 230 and coupling 12 and 212 can be constructed as a unitary piece. The conduit 30 and 230 is preferably constructed of a high temperature, fire rated PVC resin material such that the conduit 30 and 230 does not melt or collapse when heated beyond the preset temperature. One (1) or several plugs 34 (one shown) can also be provided in one or both ends of the inner conduit 30 and 230 (FIG. 4). The plugs 34 are preferably similar to those described in my application Ser. No. 09/369,106, filed on Aug. 5, 1999.

The amount of the intumescent material 28, 228 and 328 which is used and needed in the coupling assembly 10, 210 and 310 is preferably dependent on the diameter of the inner passageway 22, 222 or 322 of the firestop extension 16, 216 or 316 and the diameter and number of utility members 50 or 52 which extend through the coupling assembly 10, 210 or 310. In all the embodiments, the intumescent material 28, 228 and 328 preferably does not extend inward such as to contact the utility members 50 or 52. The greater the diameter of the inner passageway 22, 222 and 322 of the firestop extension 16, 216 and 316, the thicker the intumescent material 28, 228 and 328 must be to fill and block the inner passageway 22, 222 and 322. In all the embodiments, the intumescent material 28, 228 and 328 may be constructed of more than one (1) intumescent strips secured together. The intumescent material 28, 228 or 328 is preferably constructed of expandable graphite produced by the chemical or electrolytic treatment of high-grade crystalline flake graphite.

IN USE

The coupling assemblies 10, 210 and 310 of the present invention are used to prevent the transmission of fire and smoke through penetrations or holes in partitions 54 and 56 such as in floors, ceilings and walls of structures while allowing for the passage of utility members 50 or 52 such as pipes or cables through the partitions 54 and 56. The present embodiments are shown mounted in concrete floors. However, it is understood that the coupling assemblies 10, 210 and 210 can be mounted in any partition 54 or 56 of a structure which is constructed of any material. The coupling assembly 10 of the first embodiment is preferably mounted in a concrete floor 54 having a corrugated deck 54A (FIGS. 2 and 3). When correctly mounted in the concrete floor 54 having the corrugated deck 54A, the firestop extension 16 extends downward through the corrugated deck 54A. Therefore, the portion of the firestop extension 16 having the intumescent material 28 is only partially encased in concrete. In the first embodiment, the coupling assembly 10 is mounted in the partition 54 such that the first end 30A of the conduit 30 is flush with the upper surface of the partition 54, the open second end 12B of the coupling 12 is in contact with and secured to the corrugated deck 54A and the firestop extension 16 extends downward below the corrugated deck 54A (FIGS. 2 and 3). To mount the coupling assembly 10 in a concrete floor 54, the mounting flange 12E of the coupling 12 is secured to the corrugated deck 54A for the concrete floor 54. Preferably, the conduit 30 and the firestop extension 16 are secured in the coupling 12 prior to mounting the coupling 12 on the corrugated deck 54A. Next, a cap 26 is placed over the open first end 30A of the conduit 30 and concrete is poured around the coupling assembly 10. The cap 26 is removed from the conduit 30 after the concrete has set and the coupling assembly 10 is cast-in-place in the concrete floor 54. The anchor ring 12D acts to hold the coupling assembly 10 in place in the concrete floor 54. The anchor ring 12D also prevents water from moving between the outside surface of the coupling 12 and the concrete. The mounting of the coupling assembly 10 of the first embodiment is preferably similar to that described in my U.S. Pat. No. 5,293,724.

In the second embodiment, the coupling assembly 210 is mounted in a poured concrete floor 54 formed with a concrete form (not shown). To mount the coupling assembly 210 in the concrete floor 54, the coupling 212 of the coupling assembly 210 is secured to the concrete form. The coupling 212 is secured such that a portion of the firestop extension 216 having the intumescent material 228 extends through an opening in the form and extends below the form. In the preferred embodiment, the conduit 230 is mounted in the coupling 212 before the coupling assembly 210 is secured in the concrete. A cap (not shown) is preferably mounted on the first end 230A of the conduit 230. Next, the concrete is poured around the coupling assembly 210 and allowed to set. The thickness of the concrete floor 54 is such that the first end 230A of the conduit 230 is adjacent and flush with an upper surface of the concrete floor 54. The concrete form is then removed. The anchor ring 212D acts to secure the coupling assembly 210 in the concrete floor 54. The anchor ring 212D also prevents water from moving between the outer surface of the coupling 212 and the concrete floor 54.

In the third embodiment, the coupling assembly 310 can be installed in a partition or floor 54 or 56 after the concrete has set. The coupling assembly 310 of the third embodiment can be mounted in a concrete floor 54 having a corrugated deck 54A or in a concrete floor 56 without the corrugated deck. To mount the coupling assembly 310 in a concrete floor 54 or 56, a hole is first bored through the concrete and corrugated deck if present. Next, the coupling assembly 310 is inserted in the hole. The coupling assembly 310 is inserted in the hole such that the top flange 312D at the first end 312A of the coupling 312 is adjacent and on top of the upper surface of the partition or floor 54 or 56. The coupling assembly 310 is preferably secured in the hole by an adhesive caulk. The caulk is placed on the under surface of the top flange 312D of the coupling assembly 310. The caulk forms a watertight bold between the top flange 312D of the coupling 12 and the concrete floor 54 or 56. The coupling 312 and firestop extension 316 extend downward into the hole. When the concrete floor 54 includes a corrugated deck 54A, the firestop extension 316 preferably extends through the corrugated deck 54A such that the portion of the housing 318 having the intumescent material 328 is spaced below the corrugated deck 54A. When the concrete floor or partition 56 does not contain a corrugated deck, the firestop extension 316 is preferably completely encased in the concrete floor 56. Consequently, the second end 318B of the housing 318 of the firestop extension 316 is flush with a bottom surface of the partition 56.

In the first and second embodiments, once the coupling assembly 10 and 210 is mounted in the partition 54 or 56, the plug or plugs 34, if used, are placed in the open first end 30A and 230A or open second end 30B and 230B of the conduit 30 and 230. Preferably, the plug 34 is chosen with the specific number and size of openings needed for each utility member 50. Once the plug 34 is in place, the utility members 50 are inserted through the openings in the plug 34 and extended completely through the coupling assembly 10 and 210 (FIG. 4).

The coupling assembly 10, 210 or 310 can also be used without a plug 34 when a single utility member 52 such as a pass through pipe is intended to extend through the coupling assembly 10, 210 or 310. In these embodiments, the utility member 52 has an outer diameter only slightly less than the inner diameter of the conduit 30 and 230 or in the third embodiment, the coupling 312. The utility member 52 is secured to the conduit 30 and 230 or coupling 312. The securing of the utility member 52 to the inner surface of the conduit 30 and 230 or coupling 312 forms a seal between the conduit 30 and 230 or coupling 312 and the utility member 52 and prevents fire and smoke from passing through the coupling assembly 10, 210 or 310 around the outside of the utility member 52. The securing of the utility member 52 to the conduit 30 and 230 or coupling 312 also provides vertical support for the utility member 52.

Once installed in the partition 54 or 56, the coupling assembly 10, 210 or 310 acts in response to heat to prevent the passage of fire and smoke through the coupling assembly 10, 210 or 310. In use, when the intumescent material 28, 228 or 328 in the housing 18, 218 or 318 of the firestop extension 16, 216 or 316 is heated beyond a preset or predetermined temperature, the intumescent material 28, 228 or 328 expands. In the preferred embodiment, the preset temperature is approximately 250° F. (121° C.). As the intumescent material 28, 228 or 328 expands, the housing 18, 218 or 318 of the firestop extension 16, 216 or 316 prevents the intumescent material 28, 228 or 328 from expanding outward and downward and forces the material 28, 228 or 328 to expand inward and upward to close off the inner passageway 22, 222 or 322 of the firestop extension 16, 216 or 316 and thus close the second end 12B, 212B or 312B of the coupling 12, 212 or 312. When heated, the intumescent material 28, 228 or 328 preferably converts into a very bulky material and tends to cling to itself and completely seals off the inner passageway 22, 222 or 322 of the firestop extension 16, 216 or 316. In embodiments where the utility members 50 or 52 are formed of a meltable material, the utility members 50 or 52 preferably collapse when heated beyond the preset temperature and the intumescent material 28, 228 or 328 expands into the inner passageway 22, 222 or 322 of the firestop extension 16, 216 or 316 around the collapsed utility members 50 or 52. Alternatively, the intumescent material 28, 228 or 328 will crush the weakened utility members 50 or 52 as the intumescent material 28, 228 or 328 expands. In another embodiment, where the utility members 50 or 52 do not melt, the intumescent material 28, 228 or 328 expands and surrounds the utility members 50 or 52 and seals the inner passageway 22, 222 or 322 of the firestop extension 16, 216 or 316 around the utility members 50 or 52.

It is intended that the foregoing description be only illustrative of the present invention and that the present invention be limited only by the hereinafter appended claims.

I claim:

1. A firestop coupling assembly for use in allowing utility members to pass through a partition of a structure and to prevent transmission of fire and smoke through the partition of the structure, which comprises:
   (a) a coupling constructed of plastic having an open first end and an open second end with a sidewall having an outer surface and an inner surface extending therebetween and having an inner passageway around a longitudinal axis of the assembly; and
   (b) a firestop extension mounted on the inner surface of the sidewall of the coupling and including a housing constructed of metal having an inner passageway and an intumescent material mounted in the inner passageway adjacent one end of the housing spaced apart from the coupling wherein when the intumescent material is heated above a predetermined temperature, the intumescent material expands to fill the inner passageway of the housing.

2. The coupling assembly of claim 1 wherein a conduit having opposed ends with an inner passageway extending therebetween is mounted in the inner passageway of the coupling adjacent the first end of the coupling and wherein the conduit extends outward away from the second end of the coupling to a surface of the partition.

3. The coupling assembly of claim 2 wherein a plug having at least one opening extending through the plug is mounted in one end of the conduit to close the one end of the conduit and wherein a longitudinal axis of the opening is parallel to the longitudinal axis of the assembly.

4. The coupling assembly of claim 1 wherein a conduit having opposed ends is mounted in the inner passageway of the coupling and extends completely through the coupling and the extension such that the ends of the conduit extend beyond the assembly.

5. The coupling assembly of claim 1 wherein the partition is a floor in which the coupling assembly is to be installed and is constructed of concrete and wherein the coupling has a flange around the outer surface of the sidewall adjacent the first end to allow for securely mounting the assembly in the floor.

6. The coupling assembly of claim 1 wherein the firestop extension is mounted such that a portion of the housing having the intumescent material extends beyond the second end of the coupling in a direction opposite the first end of the coupling.

7. The coupling assembly of claim 6 wherein a fastener is mounted through the coupling and into contact with the housing to secure the firestop extension in the coupling.

8. The coupling assembly of claim 6 wherein a conduit is mounted on the inner surface of the sidewall of the coupling adjacent the first end of the coupling and extends outward away from the second end of the coupling to a surface of the partition.

9. The coupling assembly of claim 6 wherein the portion of the housing of the firestop extension having the intumescent material extends beyond a surface of the partition.

10. The coupling assembly of claim 1 wherein the housing extends beyond the intumescent material and is folded over to retain the intumescent material in the inner passageway of the housing during expansion.

11. A method for allowing utility members to pass through a partition of a structure while preventing transmission of fire and smoke through the partition of the structure, which comprises the steps of:
    (a) providing a coupling assembly including a coupling constructed of plastic having an open first end and an open second end with a sidewall having an outer surface and an inner surface extending therebetween around a longitudinal axis of the assembly; and a firestop extension mounted on the inner surface of the sidewall of the coupling and including a housing constructed of metal having an inner passageway extending therebetween and an intumescent material mounted in the inner passageway;
    (b) mounting the coupling assembly in the partition of the structure which includes:
        (i) securing the coupling of the coupling assembly to a portion of the partition;
        (ii) providing a cover for the open first end of the coupling;
        (iii) placing the cover on the open first end of the coupling;
        (iv) pouring concrete around the coupling assembly and allowing the concrete to harden to form the partition; and
        (v) removing the cover;
    (c) extending utility members through the firestop coupling assembly; and
    (d) heating the intumescent material mounted in the housing of the firestop extension of the coupling assembly above a preset temperature, wherein when the intumescent material is heated, the intumescent material expands to close the inner passageway of the housing of the firestop extension and sealingly expand around the utility members extending through the coupling assembly such that smoke and fire are unable to move past the intumescent material in the inner passageway of the housing of the firestop extension.

12. The method of claim 11 wherein in step (b), the coupling assembly is mounted on a corrugated deck of the partition such that the firestop extension extends through an opening in the corrugated deck and is spaced beyond the partition.

13. A fluid conduit system for use in a structure for carrying fluid through the structure and to prevent the transmission of fire and smoke through a partition of the structure, the system which comprises:
    (a) at least one fluid carrying conduit for carrying fluid through the structure; and
    (b) at least one coupling assembly mounted in the partition of the structure wherein the coupling assembly includes:
        (i) a coupling constructed of plastic having an open first end and an open second end with a sidewall having an outer surface and an inner surface extending therebetween and having an inner passageway around a longitudinal axis of the assembly; and
        (ii) a firestop extension mounted on the inner surface of the sidewall of the coupling and including a housing constructed of metal having an inner passageway and an intumescent material mounted in the inner passageway adjacent one end of the housing spaced apart from the coupling;
wherein the fluid carrying conduit extends through the coupling assembly through the partition and wherein when the intumescent material is heated above a predetermined temperature, the intumescent material expands to fill the inner passageway of the housing around the fluid carrying conduit and acts to seal the inner passageway of the housing and the coupling.

14. The system of claim 13 wherein the fluid carrying conduit is constructed of plastic and wherein when the fluid carrying conduit is heated above the preset temperature, the fluid carrying conduit weakens such that as the intumescent material expands, the intumescent material crushes the fluid carrying conduit as the intumescent material fills the inner passageway of the housing.

15. The system of claim 13 wherein the partition is a concrete floor having a corrugated deck and wherein the coupling assembly is mounted in the concrete floor such that the firestop extension extends through an opening in the corrugated deck and is spaced beyond the partition.

* * * * *